United States Patent
Imaizumi et al.

(10) Patent No.: US 8,260,375 B2
(45) Date of Patent: Sep. 4, 2012

(54) ELECTRONIC DEVICE AND CASE FOR THE SAME

(75) Inventors: Masaru Imaizumi, Tokyo (JP); Yohei Kawahara, Tokyo (JP); Koji Saito, Tokyo (JP); Eiji Nakata, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 860 days.

(21) Appl. No.: 12/017,633

(22) Filed: Jan. 22, 2008

(65) Prior Publication Data

US 2008/0182633 A1 Jul. 31, 2008

(30) Foreign Application Priority Data

Jan. 31, 2007 (JP) ................. 2007-021229

(51) Int. Cl.
*H04M 1/00* (2006.01)
(52) U.S. Cl. .................. 455/575.1; 455/575.8; 361/600; 361/679.01; 361/679.56
(58) Field of Classification Search ............. 455/575.1, 455/575.8, 90.3, 550.1; 464/170; 361/600, 361/679.01–679.03, 679.55, 679.56; 174/559, 174/58, 63
See application file for complete search history.

(56) References Cited

U.S. PATENT DOCUMENTS

| 6,655,449 | B1 * | 12/2003 | Hsien | 165/80.4 |
| 7,477,737 | B2 * | 1/2009 | Shiogama | 379/447 |
| 2003/0013418 | A1 * | 1/2003 | Kato | 455/90 |

FOREIGN PATENT DOCUMENTS

| JP | 2001-119455 A | 4/2001 |
| JP | 2005-327933 | 11/2005 |
| JP | 2006-066472 | 3/2006 |

* cited by examiner

*Primary Examiner* — Marcos Torres
(74) *Attorney, Agent, or Firm* — Buchanan Ingersoll & Rooney PC

(57) ABSTRACT

An electronic device has a case that is formed by combining first and second members respectively having first and second engaging portions formed along an outer circumferential portion thereof such that the first and second members make contact with each other. The electronic device includes a corner engaging member having a rib, an outer supporting member and an inner supporting member. The rib is formed at a corner portion of the first engaging portion such that the rib is curved along the corner portion. The outer supporting member is formed at a corner portion of the second engaging portion, which corresponds to the corner portion of the first engaging portion. The outer supporting member makes contact with an outer circumferential surface of the rib. The inner supporting member makes line-contact with an inner circumferential surface of the rib. The rib is inserted between the outer supporting member and the inner supporting member.

11 Claims, 14 Drawing Sheets

Fig. 3
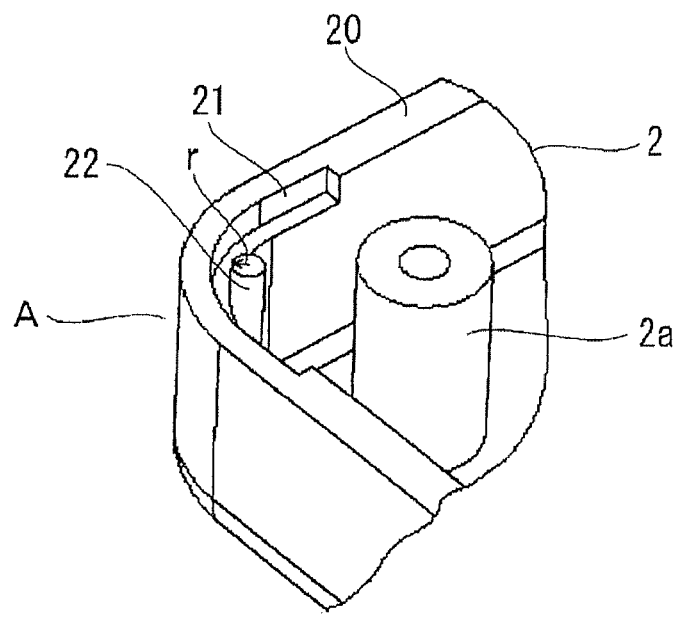
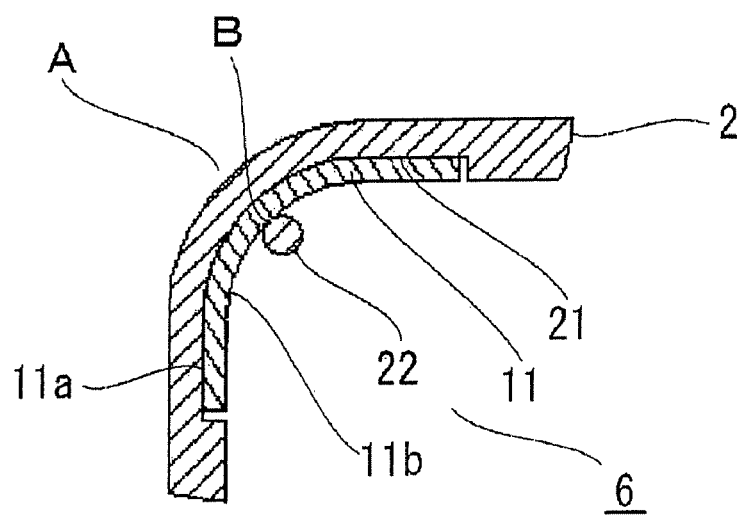
Fig. 4

Fig. 7
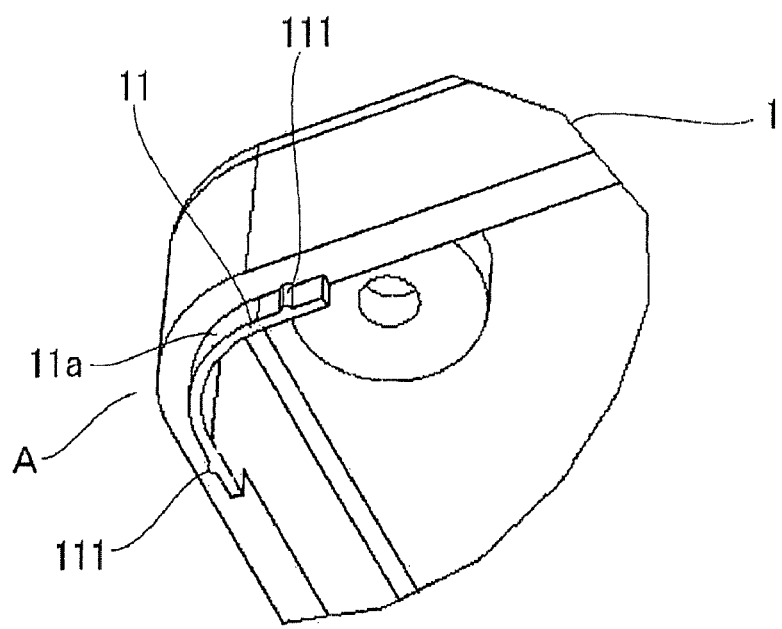
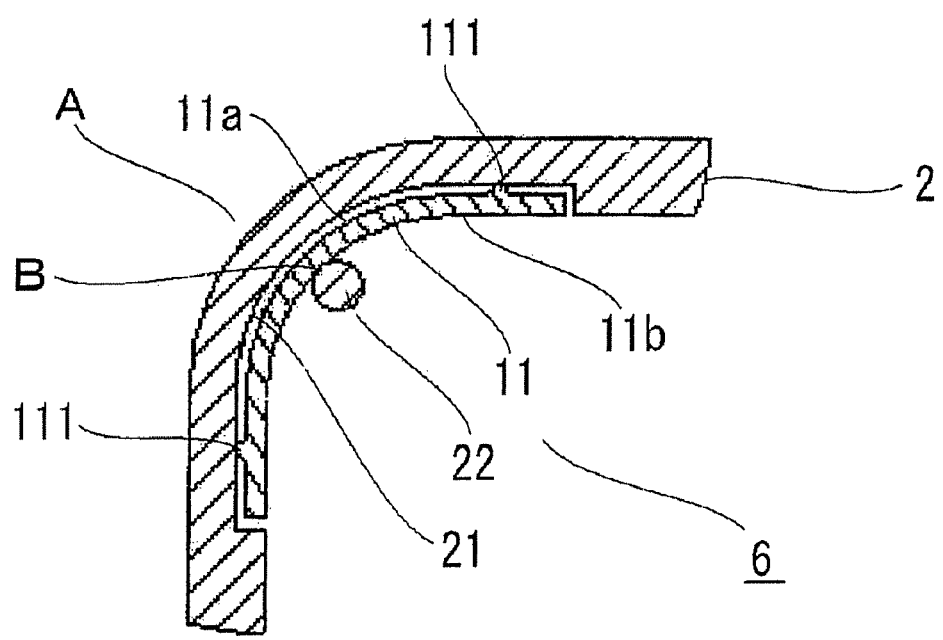
Fig. 8

Fig. 11
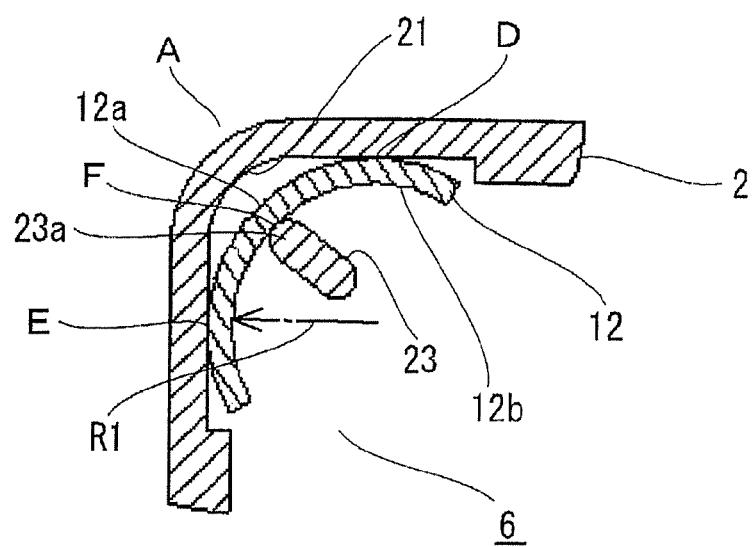
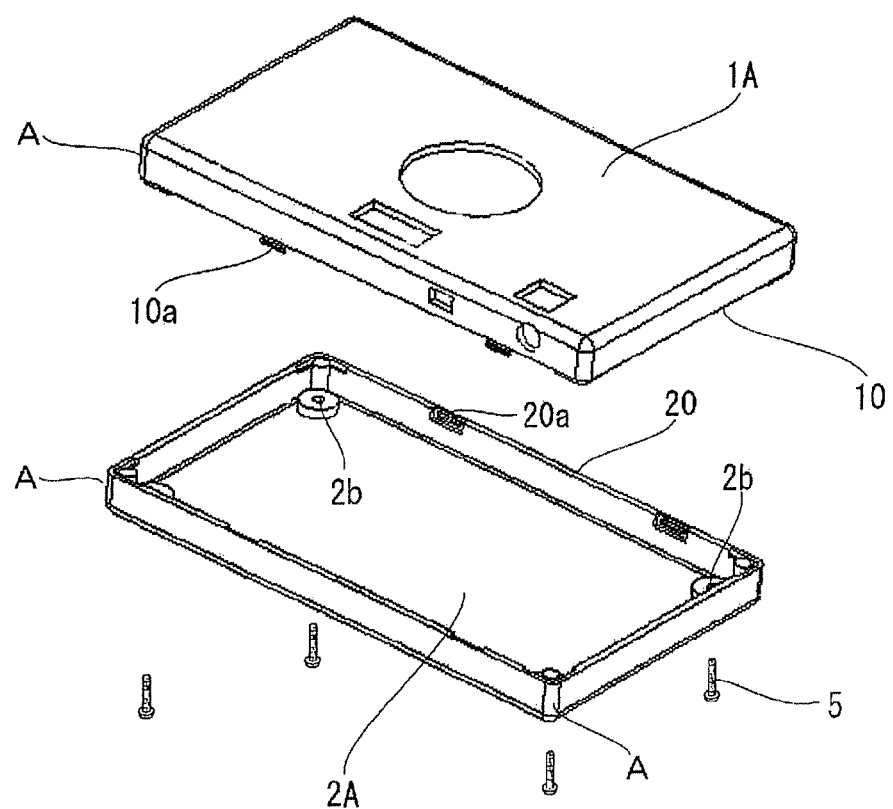
Fig. 12

Fig. 15
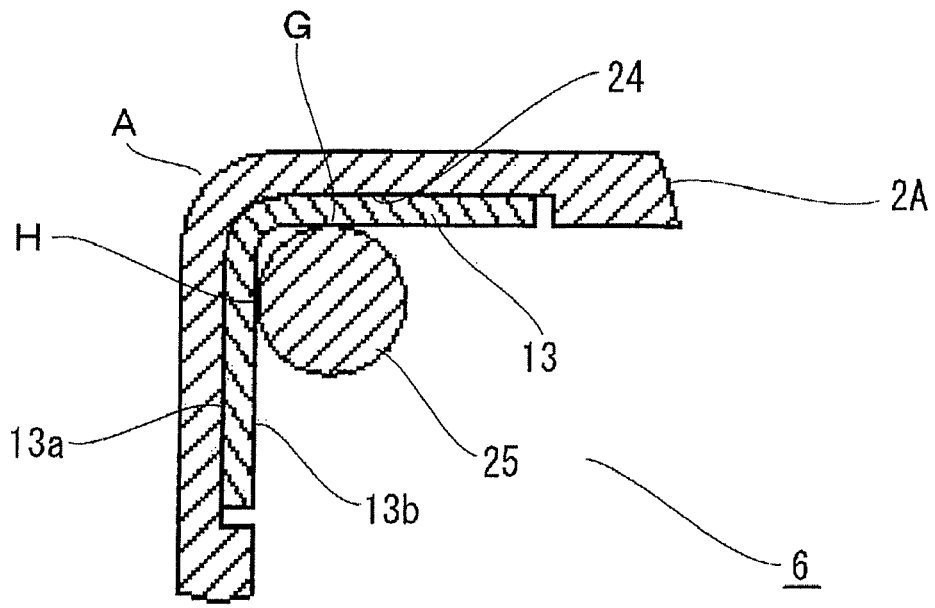
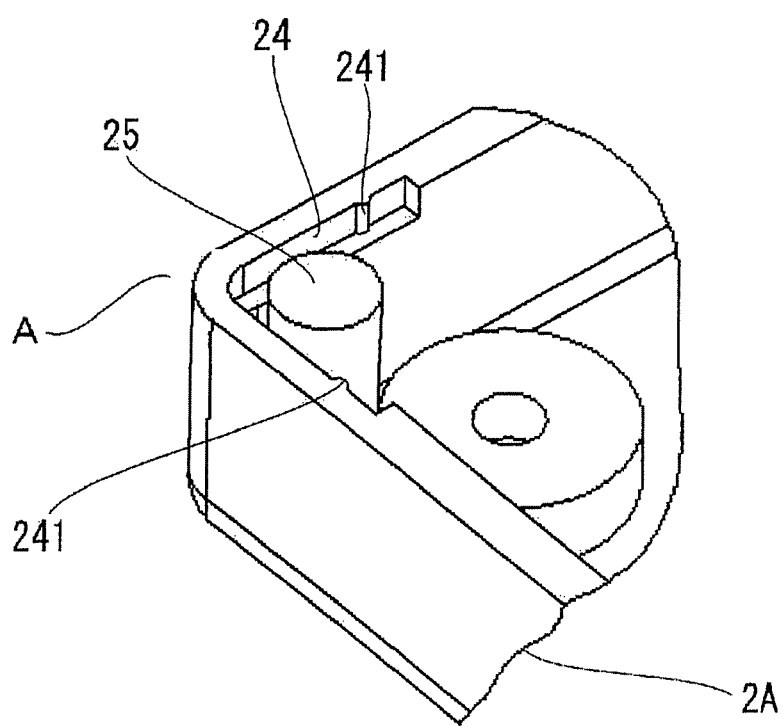
Fig. 16

Fig. 19
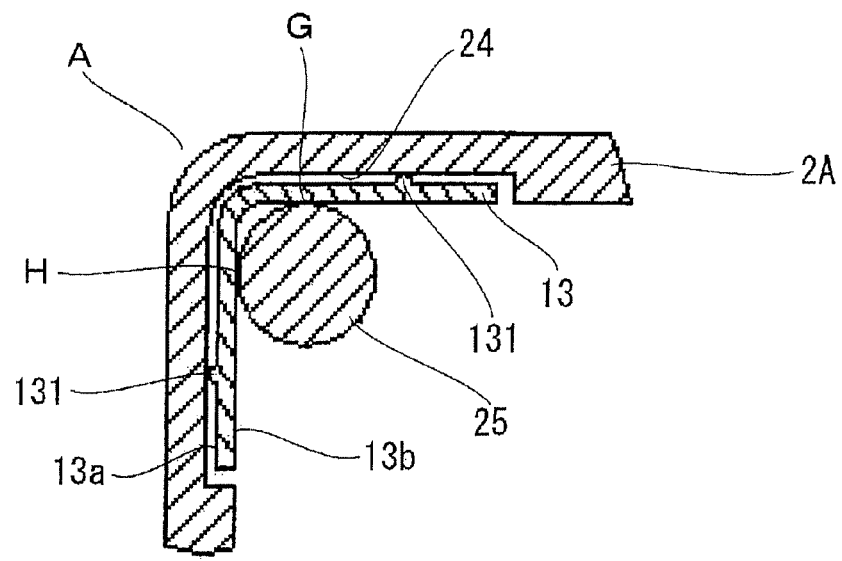
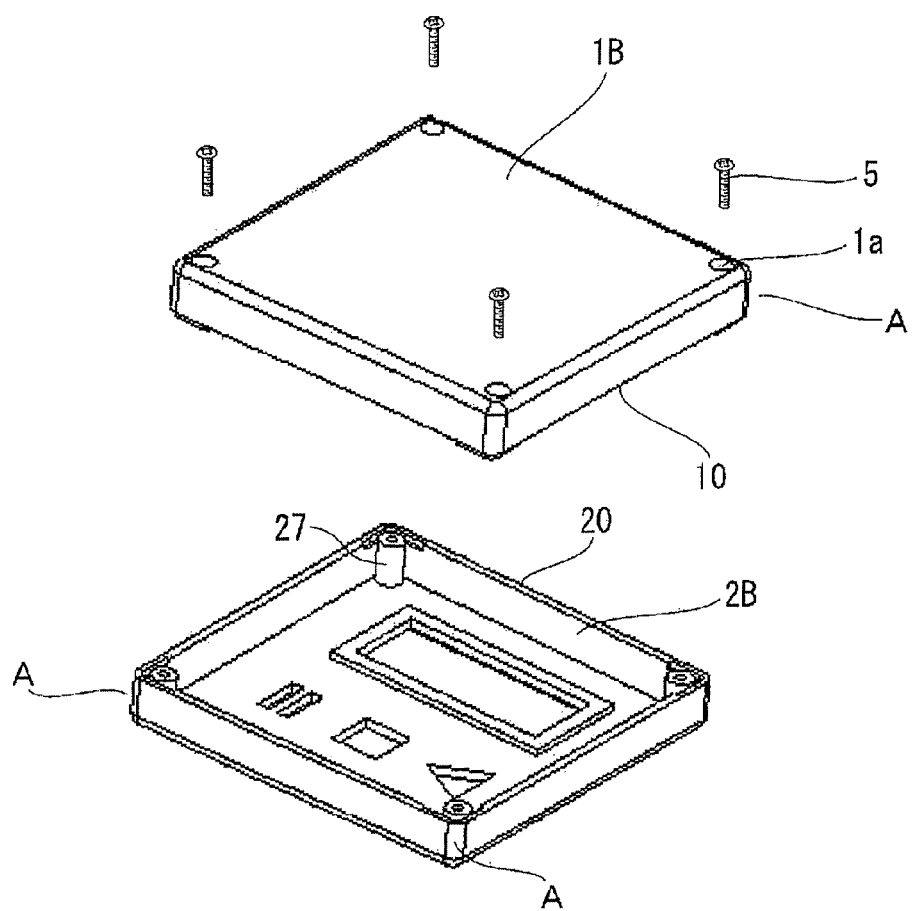
Fig. 20

Fig. 21
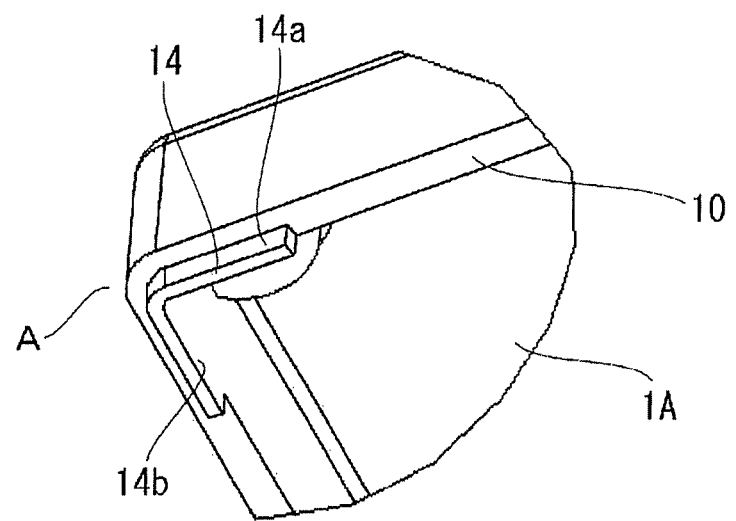
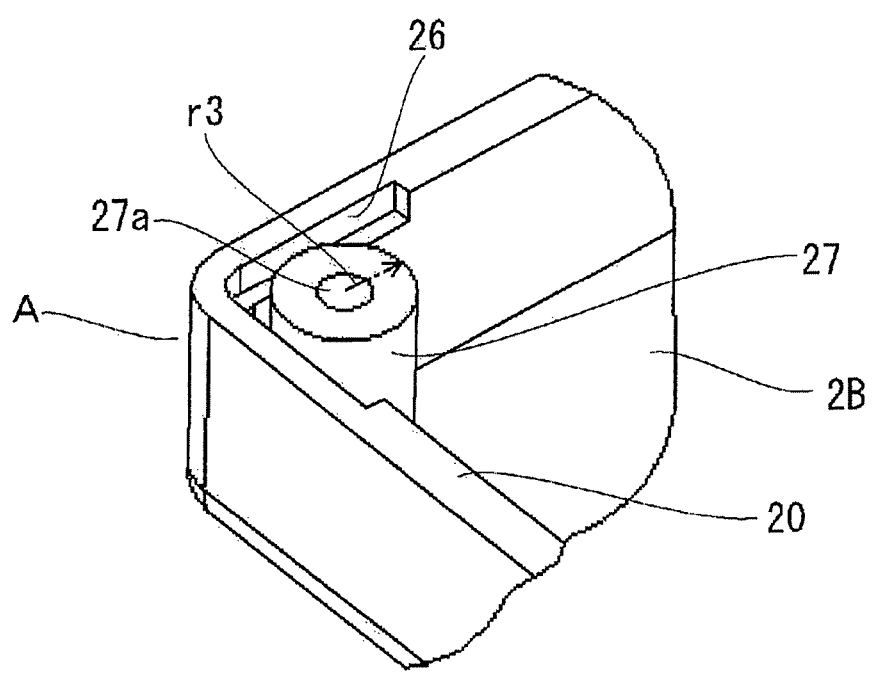
Fig. 22

Fig. 23
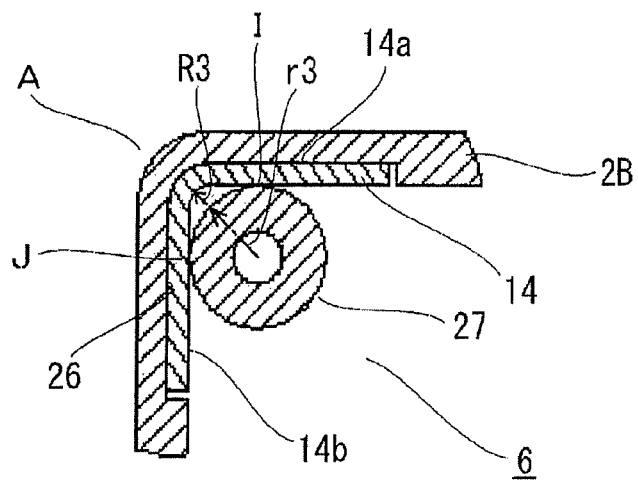
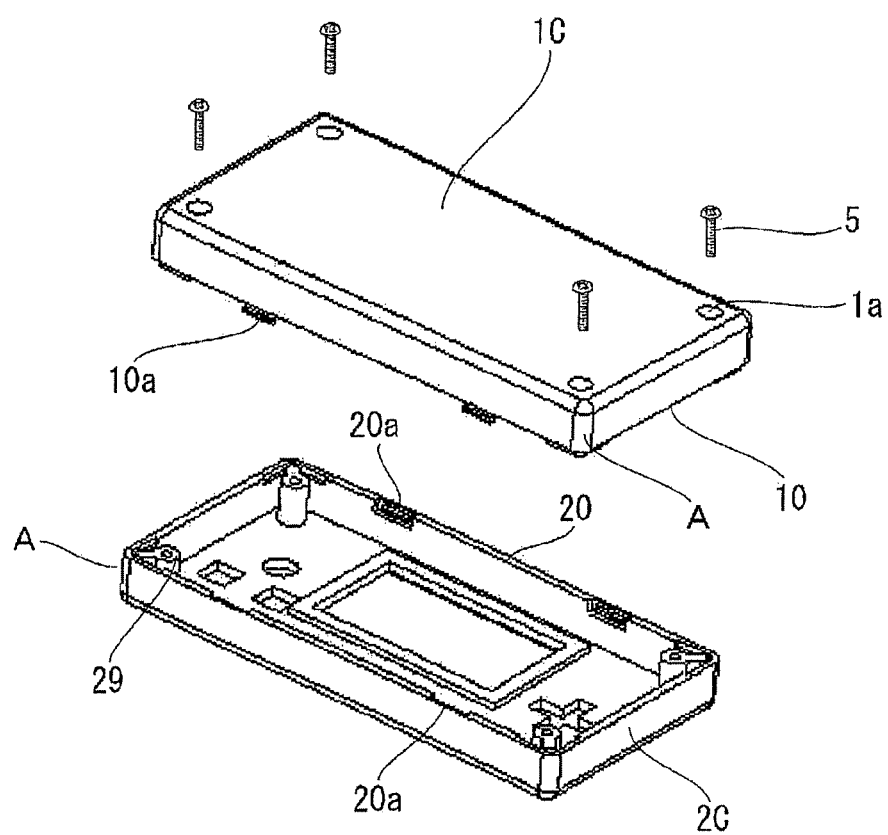
Fig. 24

Fig. 25
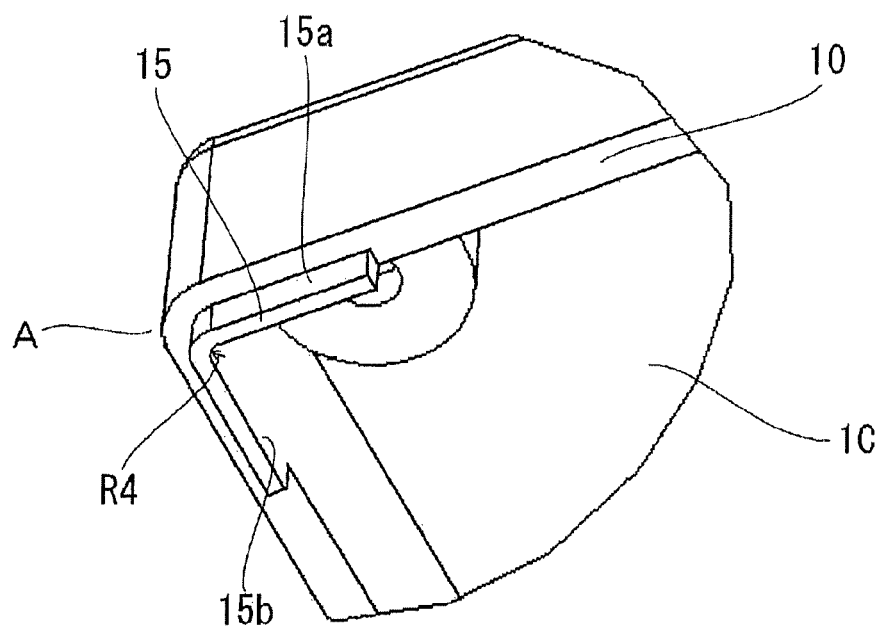
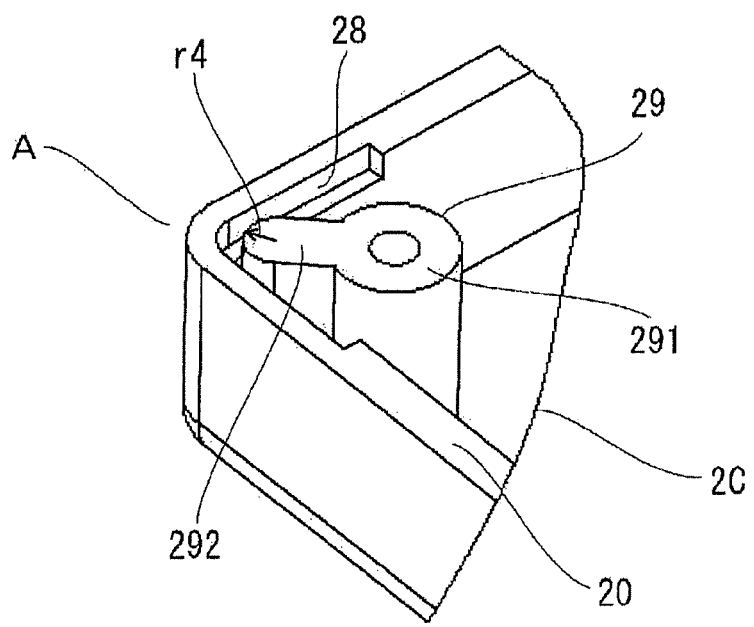
Fig. 26

ELECTRONIC DEVICE AND CASE FOR THE SAME

BACKGROUND OF THE INVENTION

1. Field of the Invention

The present invention relates to an electronic device and a case for the electronic device. More particularly, the present invention relates to a mobile electronic device, for example, such as a mobile phone, a personal digital assistance and a case for the electronic device.

2. Description of the Related Art

According to the prior art disclosed in the claim 1 and FIG. 1 of Japan Patent Publication No. 2001-119455, the case for enhancing strength thereof and reducing deformation and creak thereof includes a front case and a rear case, and a substrate is disposed in a cavity defined by the front case and the rear case. The rear case has a concave portion, and a sidewall having the concave portion has a relatively thicker thickness. A rib is formed parallel with the sidewall to define a battery section and an antenna section.

However, according to the prior art described above, an effective space is reduced since the relatively thicker thickness of the sidewall and the rib. Therefore, there is limitation for disposing the substrate and the battery in the space defined by the case, so that it is very hard to reduce a size and weight of an electronic device. Additionally, the end portion of the sidewall of the front case is inserted between the sidewall of the rear case and the rib that is substantially parallel with the sidewall of the rear case, but a spatial margin exists between the end portion of the sidewall of the front case and the concave portion of the rear case. Therefore, when the front case and the rear case are combined with each other, one of the front case and the rear case may be biased in a range of the spatial margin, and only of the concave portion of the rear case may be combined with the end portion of the sidewall of the front case to generate creak by scratching between the front case and the rear case.

SUMMARY OF THE INVENTION

Exemplary embodiment of the present invention provides an electronic device capable of increasing an effective space for disposing elements thereof, enhancing strength to reduce deformation thereof and reducing creak.

In an exemplary embodiment of an electronic device according to the present invention, the electronic device has a case that is formed by combining a first member having a first engaging portion formed along an outer circumferential portion thereof with a second member having a second engaging portion formed along an outer circumferential portion thereof such that the first connecting member and the second connecting member make contact with each other. The electronic device includes a rib, an outer supporting member and an inner supporting member. The rib is formed at a corner portion of the first engaging portion such that the rib is curved along the corner portion. The outer supporting member is formed at a corner portion of the second engaging portion, which corresponds to the corner portion of the first engaging portion. The outer supporting member makes contact with an outer circumferential surface of the rib. The inner supporting member makes line-contact with an inner circumferential surface of the rib. The rib is held between the outer supporting member and the inner supporting member.

According to the present invention, the corner portion engaging member including the rib, the outer supporting member and the inner supporting member is formed at the corner portion of the case. The rib formed along the corner portion of the first engaging portion of the first member is inserted between the outer supporting member formed at the corner portion of the second engaging portion of the second member and inner supporting member making line-contact with the inner circumferential surface of the rib. Therefore, when the first member and the second member are combined with each other, a relative position of the first member and the second member is guided. Therefore, the strength of the corner portion of the case is enhanced and the deformation of the case is reduced. Additionally, a biased combination between the first member and the second member is prevented, so that scratch between the first member and the second member is prevented. Furthermore, the contact area between the inner supporting member and the inner circumferential surface of the rib is reduced to reduce creak since the inner supporting member and the inner circumferential surface of the rib make line-contact with each other. Additionally, the corner portion engaging member is formed at the corner portion of the case to save the space in the case.

The above and other features and advantages of the present invention will become more apparent by describing in detailed exemplary embodiments thereof with reference to the accompanying drawings.

BRIEF DESCRIPTION OF THE DRAWINGS

FIG. 3 is a perspective view illustrating a corner portion of a second engaging portion of a second member in the case in FIG. 1;

FIG. 4 is a cross-sectional view illustrating positions of elements in the corner portion when the first engaging portion and the second engaging portion in FIG. 1 are combined with each other;

FIG. 7 is a perspective view illustrating a corner portion of a first engaging portion of a first member in the case according to a second modified embodiment in the second exemplary of the present invention;

FIG. 8 is a cross-sectional view illustrating positions of elements in the corner portion when the first engaging portion in FIG. 7 and a second engaging portion are combined with each other;

FIG. 11 is a cross-sectional view illustrating positions of elements in the corner portion when the first engaging portion in FIG. 10 and a second engaging portion are combined with each other;

FIG. 12 is an exploded perspective view illustrating a case for an electronic device according to a third exemplary embodiment of the present invention;

FIG. 15 is a cross-sectional view illustrating positions of elements in the corner portion when the first engaging portion and the second engaging portion in FIG. 12 are combined with each other;

FIG. 16 is a perspective view illustrating a corner portion of a second engaging portion of a second member in FIG. 14 in a case according to a first modified embodiment of the third exemplary embodiment of the present invention;

FIG. 19 is a cross-sectional view illustrating positions of elements in the corner portion when the first engaging portion in FIG. 18 and a second engaging portion are combined with each other;

FIG. 20 is an exploded perspective view illustrating a case for an electronic device according to a fourth exemplary embodiment of the present invention;

FIG. 21 is a perspective view illustrating a corner portion of a first engaging portion of a first member in the case in FIG. 20;

FIG. 22 is a perspective view illustrating a corner portion of a second engaging portion of a second member in the case in FIG. 20;

FIG. 23 is a cross-sectional view illustrating positions of elements in the corner portion when the first engaging portion and the second engaging portion in FIG. 20 are combined with each other;

FIG. 24 is an exploded perspective view illustrating a case for an electronic device according to a fifth exemplary embodiment of the present invention;

FIG. 25 is a perspective view illustrating a corner portion of a first engaging portion of a first member in the case in FIG. 24;

FIG. 26 is a perspective view illustrating a corner portion of a second engaging portion of a second member in the case in FIG. 24.

DETAILED DESCRIPTION OF THE INVENTION

Embodiment 1

Figure 1:
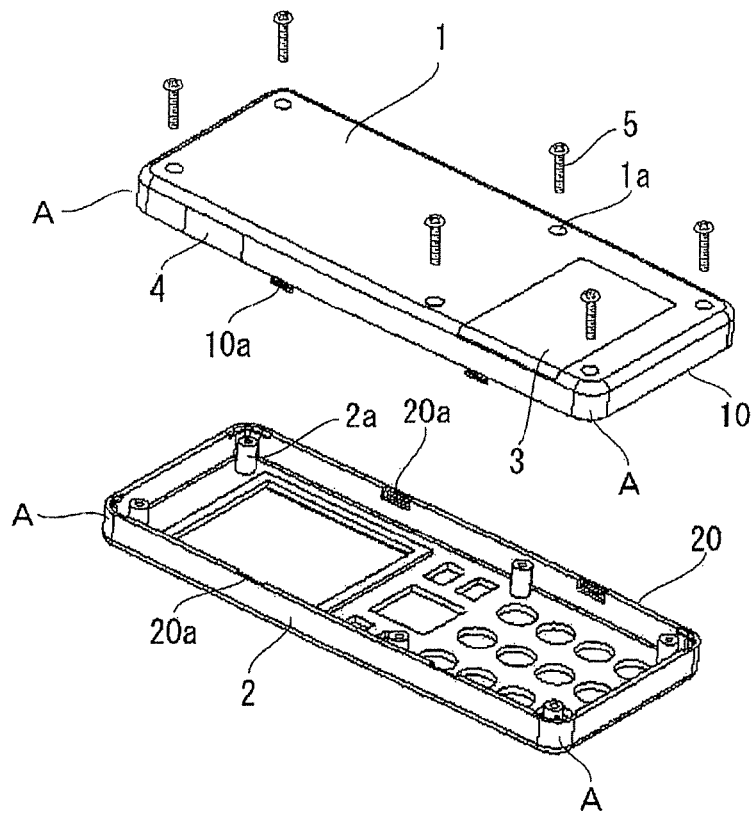
FIG. 1 is an exploded perspective view illustrating a case for an electronic device according to a first exemplary embodiment of the present invention.
Figure 2:
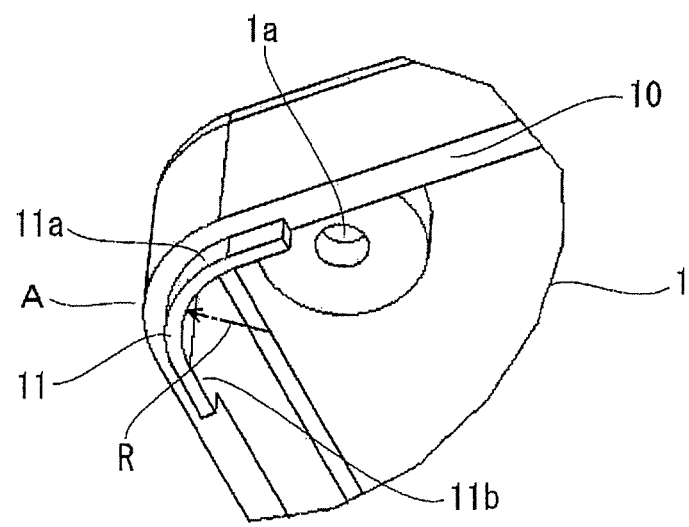
FIG. 2 is a perspective view illustrating a corner portion of a first engaging portion of a first member in the case in FIG. 1.

FIGS. 1 through 4 relate to an electronic device according to Embodiment 1. In detail, FIG. 1 is an exploded perspective view illustrating a case for an electronic device according to a first exemplary embodiment of the present invention, FIG. 2 is a perspective view illustrating a corner portion of a first engaging portion of a first member in the case in FIG. 1, FIG. 3 is a perspective view illustrating a corner portion of a second engaging portion of a second member in the case in FIG. 1, and FIG. 4 is a cross-sectional view illustrating positions of elements in the corner portion when the first engaging portion and the second engaging portion in FIG. 1 are combined with each other. The electronic device in Embodiment 1 is a cellular phone. Same reference numerals will be used for same or likely elements throughout each Embodiment, and repetitive explanation will be omitted.

A case of the cellular phone includes a first member 1 and a second member 2. The first member 1 corresponds to a backside of the case, and the second member 2 corresponds to a frontside of the case. The first member 1 and the second member 2 may have a thin plate shape. The case may include additive elements such as a battery cover 3 and a jack cover 4. The case covers a printed circuit board (not shown), a battery (not shown), a liquid crystal display part (not shown), a key button part (not shown), etc. disposed therein. The first member 1 includes a first engaging portion 10 formed along an outer circumferential portion of the first member 1, and the second member 2 includes a second engaging portion 20 engaging with the first engaging portion 10 and formed along an outer circumferential portion of the second member 2. The first engaging portion 10 of the first member 1 and the second engaging portion 20 of the second member 2 have corner portions A. The first engaging portion 10 and the second engaging portion 20 make contact with each other to form the case. The first engaging portion 10 and the second engaging portion 20 include one or more connecting members for relative positioning and fastening of the first engaging portion 10 and the second engaging portion 20.

One of the connecting members is four connecting claws 10a. Two connecting claws 10a are formed at a first long side of the first engaging portion 10 of the first member 1, and another two connecting claws 10a are formed at a second long side, which is opposite to the first long side. The four connecting claws 10a of the first member 1 are inserted into the four connecting recesses 20a, respectively to combine the first member 1 and the second member 2. The connecting claws 10a and the connecting recesses 20a are the same in the prior art. When the first member 1 and the second member 2 are combined with each other, a fixing screw 5 penetrates a penetration hole 1a of the first member 1 to arrive at a screw hole of the screw boss 2a to prevent separation between the first member 1 and the second member 2. The combination between the first member 1 and the second member 2 is not limited to the above mentioned method. For example, the first member 1 and the second member 2 may be combined with each other only through the fixing screw 5 or only through the connecting claws 10a and the connecting recesses 20a. Furthermore, the first member 1 and the second member 2 may be combined with each other through a rivet or an adhesive.

The other connecting member corresponding to the present invention is formed at corner portions A of the first member 1 and the second member 2. In the enlarged exemplary embodiment 1 shown in FIGS. 2 through 4, a corner portion engaging member 6 is formed at a corner portion A of the first member 1 and the second member 2. The corner portion engaging member 6 includes a rib 11, an outer supporting member 21 and an inner supporting member 22. The rib 11 upwardly protrudes along an outer circumferential portion of a corner portion A of the first member 1, which is curved. The outer supporting member 21 and the inner supporting member 22 are included in the second member 2. The corner portion A of the second engaging portion of the second member 2 is recessed by a thickness of the rib 11 to form the outer supporting member 21. The outer supporting member of the second member 2 makes surface-contact with an outer circumferential surface 11a of the rib 11 of the first member 1, when the first member 1 and the second member 2 are combined with each other. A protrusion is formed on a bottom surface of the second member 2 to form the inner supporting member 22. The inner supporting member 22 may have a cylindrical shape of which radius is r. The inner supporting member 22 of the second member 2 makes line-contact with an inner circumferential surface 11b of the rib 11 of the first member 1 at a contact region B when the first member 1 and the second member 2 are combined with each other. The inner circumferential surface 11b of the rib 11 has a radius of curvature of R that is greater than a radius of curvature r of the inner supporting member 22.

Hereinafter, an operation of elements in the first exemplary embodiment will be explained. When the first member 1, which is a back portion of the case, is combined with the second member 2, which is a front portion of the case, the first member 1 and the second member 2 are combined as FIG. 4, and the position of the corner portion engaging member 6 including the rib 11, the outer supporting member 21 and the inner supporting member 22 is determined as FIG. 4. In detail, the rib 11 of the first member 1 is inserted between the outer supporting member 21 formed at the corner portion A of the second member 2 and the inner supporting member 22 having the cylindrical shape and protruding from the bottom of the second member 2. In more detail, the inner circumferential surface 11b of the rib 11 having curved shape makes line-contact with the outer surface of the inner supporting member 22 at the contact region B, and the outer circumferential surface 11a of the rib 11 makes surface-contact with the outer supporting member 21 which is the recess portion of the sidewall corner portion to fix a position of the first member 1 and the second member 2.

When a user grips an electronic device such as a cellular phone, the case may be deformed. In other words, the case may be distorted or bent. In particular, the case is distorted or bent most at the corner portion thereof. In general, when the case is distorted or bent, elements of the case scratches with each other and the case creaks. In particular, the elements of the case scratch maximally at the corner portion A, and the case maximally creaks at the corner portion A. However, according to the first exemplary embodiment of the present invention, the corner portion engaging member 6 fastens the first member 1 to the second member 2, and the inner supporting member 22 makes line-contact with the inner circumferential surface 11b at a region B to minimize the contact area and hence the frictional area to thereby reduce the deformation of the case and the creak.

The case requires a space for disposing a printed circuit board, a battery, a key button part, etc. According to the first exemplary embodiment of the present invention, the corner portion engaging member 6 requires no additional space in the corner portion A to spare the space, while reducing deformation of the case. Furthermore, the relative position of the first member 1 and the second member 2, which form the case, is not changed at the corner portion A to prevent the jolting movement and the engagement in a biased state of the both members, and thus prevent the scratch between the first member 1 and the second member 2 and the creak. Additionally, an electronic device such as a cellular phone may be dropped to the ground during the handling. In particular, when the electronic device is dropped such that the corner portion of the electronic device collides against the ground, the collision area is relatively small to increase damage of the case of the electronic device. However, according to the first exemplary embodiment of the present invention, the rib 11 of the first member 1 is inserted between the inner supporting member 22 and the outer supporting member 21 in the corner portion A to enhance the strength of the case and reduce the deformation of the case and damage.

As described above, according to the first exemplary embodiment of the present invention, the inner supporting member 22 making line-contact with an inner circumferential surface 11b of the rib 11 and the outer supporting member 21 of the second member 2 making contact with an outer circumferential surface 11a of the rib 11 provided in the second engaging portion 20 supports the curved rib 11 formed in the corner portion A at the first engaging portion 10 of the first member 1 inside and outside. Therefore, when the first member 1 and the second member 2 are combined with each other, the first member 1 and the second member 2 are guided to a proper relative position. Furthermore, the deformation of the case is reduced, and a creak, which is induced by the scratch between the first member 1 and the second member 2, is also reduced. Additionally, no additional space for the corner portion engaging member 6 that guides the first member 1 and the second member 2 to the proper position is required to increase space for disposing the elements of an electronic device and strength of the corner portion A of the case. In particular, the corner portion A of the second member 2 is recessed by the thickness of the rib 11 to form the outer supporting member 21 to prevent reducing space for the disposing the elements of an electronic device.

Aside from the advantages described above, the size of the corner portion engaging member 6 may be easily adjusted by adjusting the radius of curvature of a mold (not shown) for the inner supporting member 22. In other words, the inner supporting member 22 makes line-contact with the inner circumferential surface 11b of the rib 11 so that the position of the first member 1 and the second member 2 is fixed. However, the molding (not shown) for the inner supporting member 22 may be mispositioned so that the inner supporting member 22 may be separated from the inner circumferential surface 11b of the rib 11 to induce loose fastening between the first member 1 and the second member 2. Then, the position for the inner supporting member 22 is adjusted to solve above-mentioned problem. However, finding the proper position for the inner supporting member 22 at a first time is a very hard thing.

In this case, the radius of curvature r of the inner supporting member 22 may be adjusted to compensate malpositioning of the inner supporting member 22 and the rib 11 or to make good contact between the inner supporting member 22 and the rib 11. In general, the case is formed through a molding method using molten metal or molten plastics. The corner portion A of the second member 2 has complex shape, and adjusting the position of the inner supporting member 22 is very hard. However, adjusting the radius of curvature r of the inner supporting member 22 is relatively simple. Therefore, by adjusting the radius of curvature r of the inner supporting member 22, the inner supporting member 22 may make good contact with the rib 11 even though the inner supporting member 22 is mispositioned.

Embodiment 2

Figure 5:
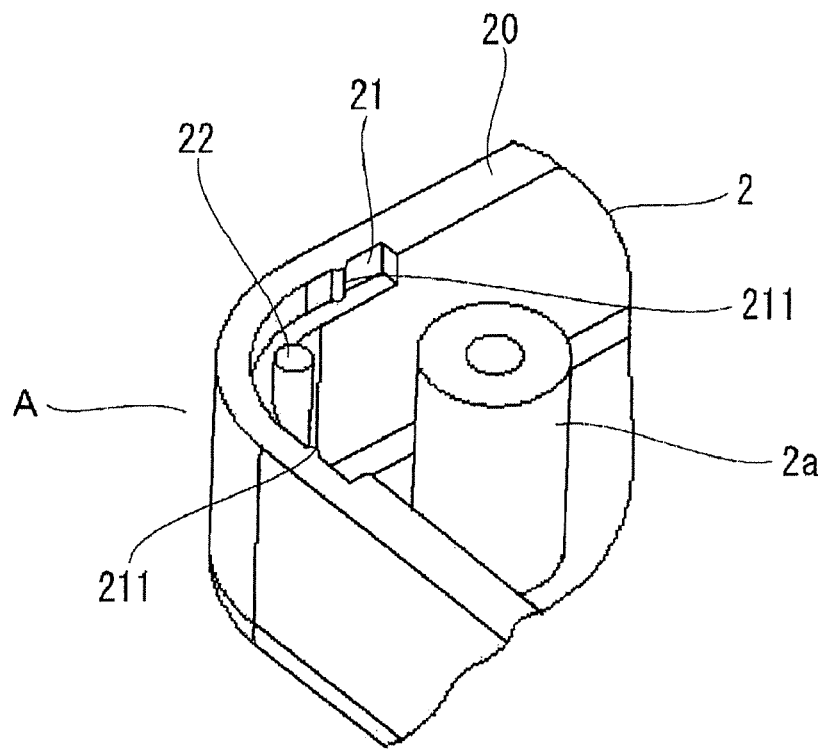
FIG. 5 is a perspective view illustrating a corner portion of a second engaging portion of a second member in a case according to a first modified embodiment in a second exemplary embodiment of the present invention.
Figure 6:
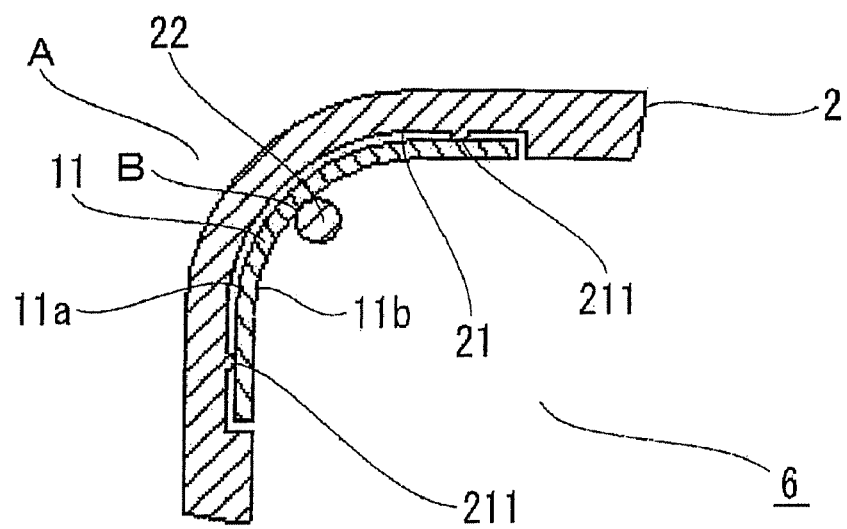
FIG. 6 is a cross-sectional view illustrating positions of elements in the corner portion when a first engaging portion and the second engaging portion in FIG. 5 are combined with each other.
Figure 9:
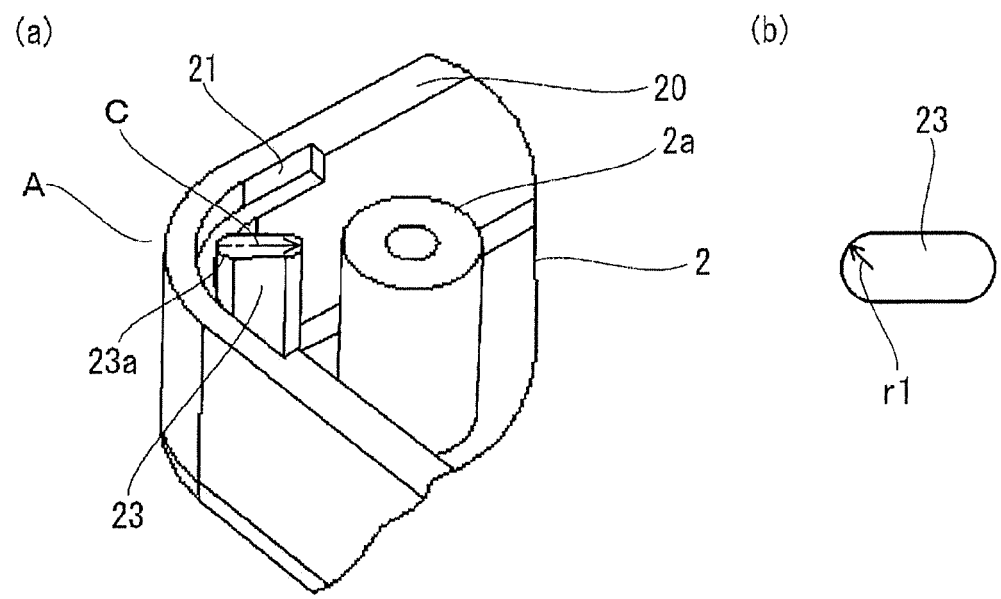
FIG. 9A is a perspective view illustrating a corner portion of a second engaging portion of a second member in a case according to a third modified embodiment in a second exemplary embodiment of the present invention.
FIG. 9B is an enlarged plan view illustrating an inner supporting member in FIG. 9A.
Figure 10:
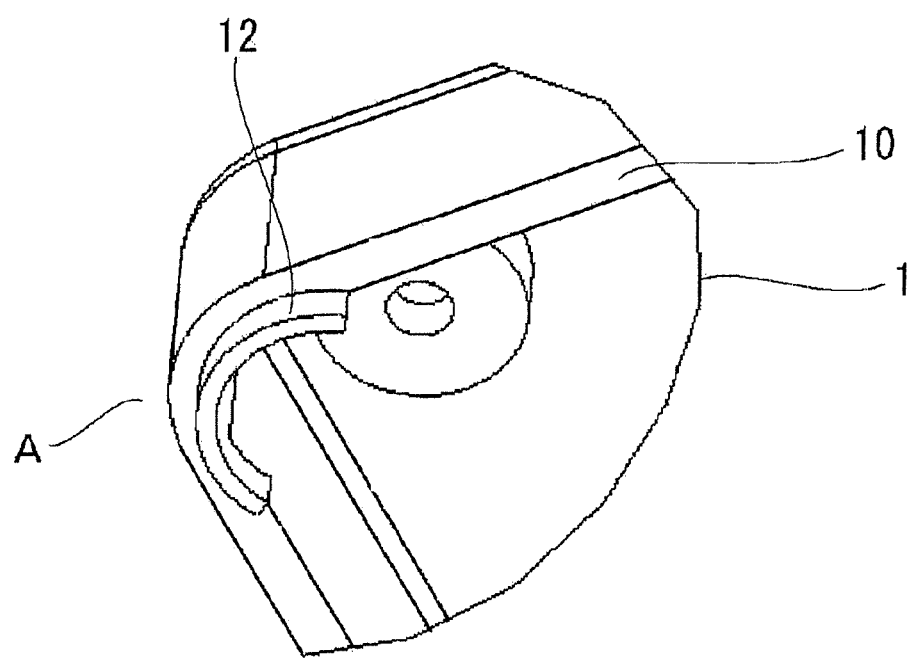
FIG. 10 is a perspective view illustrating a corner portion of a first engaging portion of a first member in the case according to a fourth modified embodiment in the second exemplary of the present invention.

FIGS. 5 through 11 are figures for explaining an electronic device according to the second exemplary embodiment. FIGS. 5 and 6 show a first modified example of the corner portion engaging member in FIGS. 3 and 4. FIGS. 7 and 8 show a second modified example of the corner portion engaging member in FIGS. 2 and 4. FIG. 9A shows a third modified example of the corner portion engaging member in FIG. 3. FIGS. 10 and 11 show a fourth modified example of the corner portion engaging member in FIGS. 2 and 4. In detail, FIGS. 5 and 9A are a perspective view illustrating a corner portion of a second engaging portion of a second member corresponding to the above FIG. 3. FIG. 9B is an enlarged plan view illustrating an inner supporting member in FIG. 9A. FIGS. 6, 8 and 11 are a cross-sectional view illustrating positions of elements in the corner portion when a first engaging portion and the second engaging portion are combined with each other. FIGS. 7 and 10 are a perspective view illustrating a corner portion of a first engaging portion of a first member in the case corresponding to the above FIG. 2.

The outer supporting member 21 according to the first modified example in FIGS. 5 and 6 includes two protrusions 211, each of which has triangular cross-section. The two protrusions 211 protrude from the inner circumferential surface of the outer supporting member 21 to reduce contact area between the outer supporting member 21 and the outer circumferential surface 11a of the rib 11 in FIG. 2. The two protrusions 211 make contact with the outer circumferential surface 11a of the rib 11 such that the contact region has a line-shape of which direction is substantially parallel with a direction of combination. For example, the two protrusions 211 may be symmetrically disposed with respect to the inner supporting member 22. Preferably, the two protrusions 211 are disposed adjacent to the end portions of the outer supporting member 21, respectively. However, the position of the two protrusions 211 is not limited. Furthermore, the number of the protrusions 211 is not limited to two. For example, one protrusion 211, three or more than tree protrusions 211 may be formed. Additionally, the cross-sectional shape of the protrusions 211 is not limited to the triangular shape. For example, the protrusions 211 may have a semicircular shape. Other elements except for the protrusions 211 of the inner supporting member 22 are same as those in FIGS. 1 through 4.

According to the first modified example, the two protrusions 211 spaced to each other and disposed adjacent to the end portions of the outer supporting member 21 make line-contact with the outer circumferential surface 11a of the rib 11, and the inner supporting member 22 makes line-contact with the inner circumferential surface 11b of the rib 11 at a region B to make three-line contact between the first member 1 and the second member 2, when the first member 1 is combined with the second member 2, as shown in FIG. 6. Therefore, the contact area between the first member 1 and the second 2 may be further reduced, while reducing deformation of the case and creak.

According to the second modified example in FIGS. 7 and 8, protrusions are formed likewise the first modified example. However, in the second modified example, the protrusions are formed on the outer circumferential surface 11a of the rib 11 instead of the inner surface of the outer supporting member 21. In detail, two protrusions 111 are formed on the outer circumferential surface 11a of the rib 11. The two protrusions 111 of the rib 11 make line-contact with the inner surface of the outer supporting member 21, and the inner supporting member 22 makes line-contact with the inner circumferential surface 11b of the rib 11 to make three line-contacts between the first member 1 and the second member 2. Therefore, the contact area between the first member 1 and the second member 2 may be further reduced, while reducing deformation of the case and creak.

According to the third modified example in FIGS. 9A and 9B, the inner supporting member 23 supporting the inner circumferential surface 11b of the rib 11 has a shape which is formed by dragging a circle. In the first and second modified examples, the inner supporting member 22 has a circular cross-sectional shape. However, the shape of the inner supporting member is not limited to the circular shape. In detail, as long as the region of the inner supporting member, which makes contact with the inner circumferential surface 11b of the rib 11, has a circular or a curved shape, the entire shape of the inner supporting member is not limited. According to the third modified example in FIGS. 9A and 9B, the inner supporting member 23 is extended along a direction substantially parallel with an impact direction when the corner portion A collides with the ground, and the inner supporting member 23 has a radius of curvature r1 that is smaller than the radius of curvature R of the inner circumferential surface 11b of the rib 11 of the first member 1. Therefore, the strength of the inner supporting member 23 is enhanced against the collision between the corner portion A and the ground to reduce the deformation of the case and enhance the impact resistance.

According to the fourth modified example in FIGS. 10 and 11, the second member 2 is substantially same as that in FIG. 9, and the rib 12 of the first member 1 has a circular shape. The inner circumferential surface 12b of the rib 12 has a radius of curvature R1 that is greater than the radius of curvature r1 of the outer surface 23a of the inner supporting member 23. The ribs 11 of the first exemplary embodiment and the first modified example and the second modified example of the second exemplary embodiment are correspondingly curved to the corner portion A. However, the rib 12 of the fourth modified example of Embodiment 2 is curved differently from the corner portion A.

In the fourth modified example, the outer circumferential surface 12a of the rib 12 of the first member 1 makes line-contact with the outer supporting member 21 of the second member 2 at two regions D and E, and the inner circumferential surface 12b of the rib 12 makes line-contact with the outer surface 23a of the inner supporting member 23 at a region F corresponding to a center of the two regions D and E to fasten the first member 1 and the second member 2 to each other. Thus, the contact area between the first member 1 and the second member 2 is similarly reduced. Therefore, the fourth modified example has advantages of the first, second and third modified examples.

Embodiment 3

Figure 13:
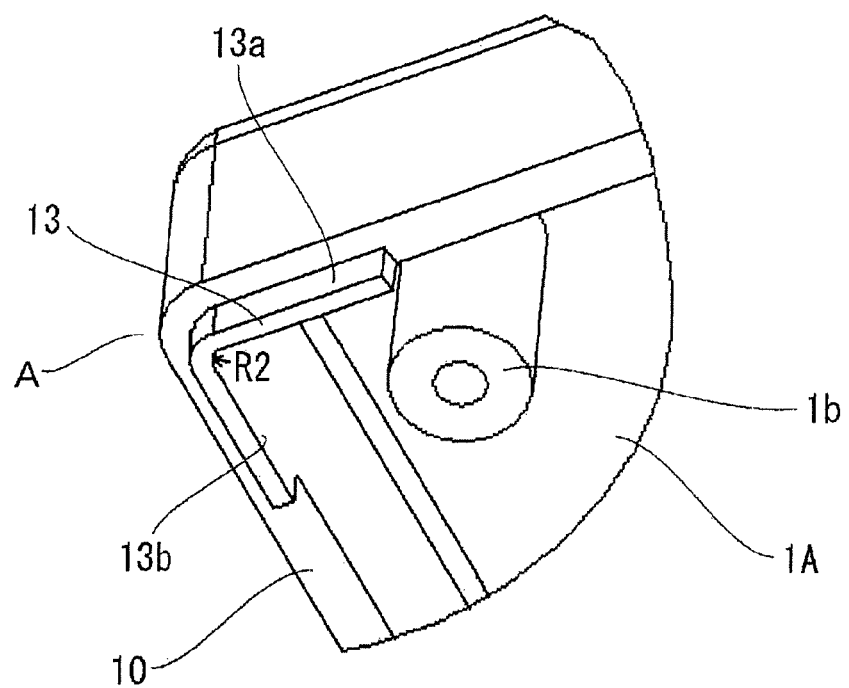
FIG. 13 is a perspective view illustrating a corner portion of a first engaging portion of a first member in the case in FIG. 12.
Figure 14:
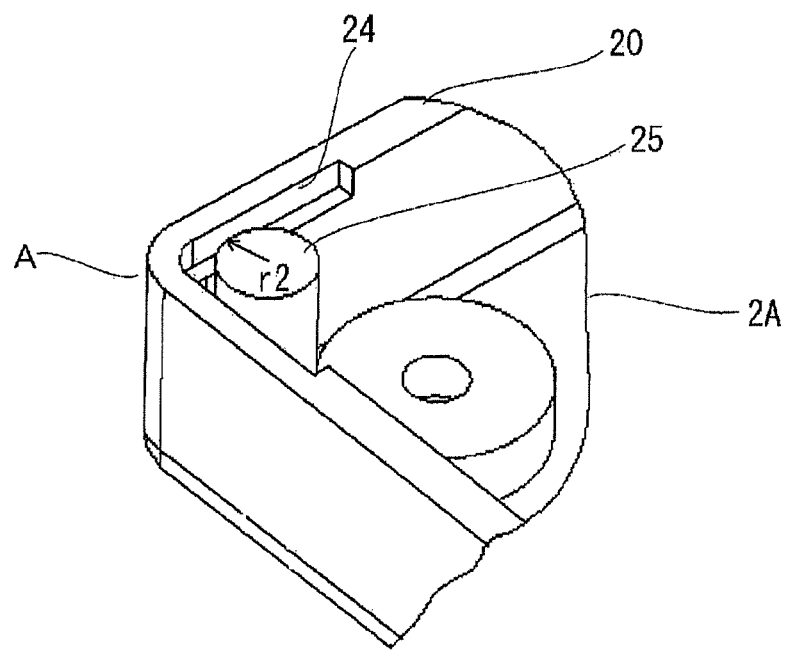
FIG. 14 is a perspective view illustrating a corner portion of a second engaging portion of a second member in the case in FIG. 12.
Figure 17:
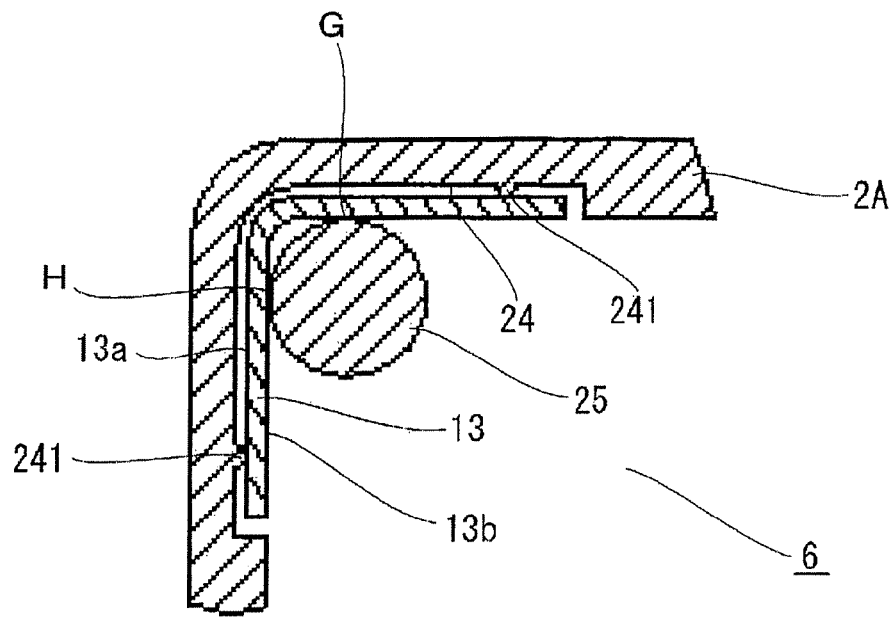
FIG. 17 is a cross-sectional view illustrating positions of elements in the corner portion when a first engaging portion and the second engaging portion in FIG. 16 are combined with each other.
Figure 18:
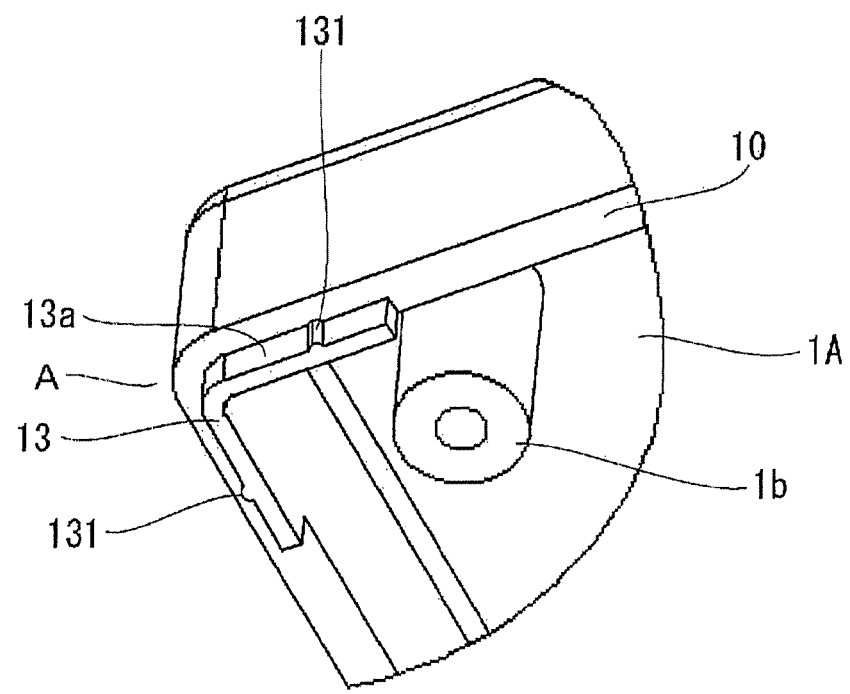
FIG. 18 is a perspective view illustrating a corner portion of a first engaging portion of a first member in the case according to a second modified embodiment of the third exemplary embodiment of the present invention.

FIGS. 12 through 15 are figures for explaining a case of an electronic device according to the third exemplary embodiment. FIG. 12 is an exploded perspective view illustrating a case for an electronic device according to a third exemplary embodiment of the present invention. FIG. 13 is a perspective view illustrating a corner portion of a first engaging portion of a first member in the case in FIG. 12. FIG. 14 is a perspective view illustrating a corner portion of a second engaging portion of a second member in the case in FIG. 12. FIG. 15 is a cross-sectional view illustrating positions of elements in the corner portion when the first engaging portion and the second engaging portion in FIG. 12 are combined with each other. FIGS. 16 and 17 show a first modified example of the corner portion in FIGS. 14 and 15. FIGS. 18 and 19 show a second modified example of the corner portion in FIGS. 13 and 15. In detail, FIG. 16 is a partial perspective view corresponding to FIG. 14. FIG. 18 is a partial perspective view corresponding to FIG. 13. FIGS. 17 and 19 are partial cross-sectional views corresponding to FIG. 15. The electronic device in the third exemplary embodiment is a digital camera, and elements such as a printed circuit board (not shown), a battery (not shown), a key button part (not shown) etc. are disposed in the case.

The case in the third exemplary embodiment has a corner portion A having a radius of curvature that is smaller than that of the previous embodiments. However, likewise the previous embodiments, the case is formed by combining a first engaging portion 10 formed along the outer circumferential portion of the first member 1A and a second engaging portion 20 formed along the outer circumferential portion of the second member 2A. Two connecting claws 10a are formed at a first long side of the first engaging portion 10 of the first member 1A, and another two connecting claws 10a are formed at a second long side, which is opposite to the first long side. The four connecting claws 10a of the first member 1A are inserted into the four connecting recesses 20a, respectively to combine the first member 1A and the second member 2A. When the first member 1A and the second member 2A are combined with each other, a fixing screw 5 penetrates a penetration hole 2b of the second member 2A to arrive at screw hole of the screw boss 1b to prevent separation between the first member 1A and the first member 1A.

The first member 1A includes a rib 13 formed at a corner portion A of the first engaging portion 10. The rib 13 is correspondingly curved to the corner portion A of the first engaging portion 10. The second member 2A includes an outer supporting member 24 and an inner supporting member 25. The outer supporting member 24 is formed at the second engaging portion 20. The outer supporting member 24 is a recession corresponding to the outer circumferential surface 13a of the rib 13 that protrudes from the first engaging portion 10. The outer supporting member 24 makes surface-contact with the outer circumferential surface 13a of the rib 13, when the first member 1A and the second member 2A are combined with each other. The inner supporting member 25 has, for example, a cylindrical shape. The inner supporting member 25 makes line-contact with an inner circumferential surface 13b of the rib 13, when the first member 1A and the second member 2A are combined with each other. In other words, the rib 13 is inserted between the outer supporting member 24 and the inner supporting member 25, when the first member 1A and the second member 2A are combined with each other. The rib 13, the outer supporting member 24 and the inner supporting member 25 define a corner portion engaging member 6. In the present embodiment, a radius of curvature R2 of the inner circumferential surface 13b of the rib 13 is smaller than a radius of curvature r2 of the outer surface of the inner supporting member 25. Alternatively, the radius of curvature R2 of the inner circumferential surface 13b of the rib 13 may be substantially equal to the radius of curvature r2 of the outer surface of the inner supporting member 25. For example, the corner portion engaging member 6 may be employed by a case of which two adjacent sides meet each other to form a right angle or other angles, a case of which one side is straight and the other side is curved, or a case of which two adjacent sides are curved.

In the present embodiment described above, when the first member 1A corresponding to the frontside of the case is combined with the second member 2A corresponding to the backside of the case, the first member 1A and the second member 2A of the four corner portions A of the case are combined as shown in FIG. 15. In detail, when the first member 1A and the second member 2A are combined with each other, the rib 13 of the first member 1A is inserted between the outer supporting member 24 of the corner portion of the second member 2A and the inner supporting member 25 of the second member 24 such that the outer supporting member 24 makes surface-contact with the outer circumferential surface 13a of the rib 13 and the inner supporting member 25 makes line-contact with the inner circumferential surface 13b of the rib at two regions G and H. According to the present embodiment, the outer surface of the inner supporting member 25 makes line-contact with the inner circumferential surface 13b of the rib 13 at two regions G and H to increase the number of the contact regions in comparison with the first exemplary embodiment. Therefore, the strength of the case is enhanced.

The third exemplary embodiment has not only advantages of the first exemplary embodiment, but also advantages of resistance against deformation, which is caused by two contact regions G and H between the rib 13 of the first member 1A and the inner supporting member 25 of the second member 2A, while reducing creak and reducing damage when the case is dropped to the ground. As well as the first exemplary embodiment, in third exemplary embodiment, the contact between the inner supporting member 25 and the inner circumferential surface 13a of the rib 13 may be optimized by adjusting the radius of curvature of the inner supporting member 25.

In order to reduce a contact area between the outer supporting member 24 and the outer circumferential surface 13a of the rib 13 for reducing creak, protrusions may be formed as shown in the second exemplary embodiment of FIGS. 5 to 8. In detail, according to a first modified example disclosed in FIGS. 16 and 17, two protrusions 241 are spaced apart from each other and formed on the inner supporting member 24 such that the two protrusions 241 are spaced apart from each other likewise the example in FIG. 5. The two protrusions 241 of the second member 2A make line-contact with the outer circumferential surface 13a of the rib of the first member 1A, when the first member 1A and the second member 2A are combined with each other. According to a second modified example disclosed in FIGS. 18 and 19, two protrusions 131 are formed on the outer circumferential surface 13a of the rib 13 of the first member 1A such that the two protrusions 131 are spaced apart from each other likewise the example in FIG. 7. The two protrusions 131 of the rib 13 of the first member 1A make line-contact with the outer supporting member 24 of the second member 2A, when the first member 1A and the second member 2A are combined with each other.

In the above first and second modified examples, the outer circumferential surface 13a of the rib 13 makes line-contact with the outer supporting member 24 at two regions through the protrusions 241 and 131 in FIGS. 17 and 19, respectively, and the inner circumferential surface 13b of the rib 13 makes line-contact with the inner supporting member 25 at two regions G and H. Therefore, the first member 1A and the second member 2A are guided by the four line contacts, when the first member 1A and the second member 2A are combined with each other. As described above, the first and second modified examples of the third exemplary embodiment, an area of the contact region in the corner portion engaging member 6 is further reduced in comparison with the third exemplary embodiment, while reducing the deformation of the case and the creak. Likewise the second exemplary embodiment, the number of the protrusions is not limited.

Embodiment 4

FIGS. 20 through 23 are figures for explaining an electronic device according to the fourth exemplary embodiment. FIG. 20 is an exploded perspective view illustrating a case for an electronic device according to a fourth exemplary embodiment of the present invention. FIG. 21 is a perspective view illustrating a corner portion of a first engaging portion of a first member in the case in FIG. 20. FIG. 22 is a perspective view illustrating a corner portion of a second engaging portion of a second member in the case in FIG. 20. FIG. 23 is a cross-sectional view illustrating positions of elements in the corner portion when the first engaging portion and the second engaging portion in FIG. 20 are combined with each other. The electronic device in the fourth exemplary embodiment is a portable music player, for example, such as an MP3 player, and elements such as a printed circuit board (not shown), a battery (not shown), a key button part (not shown) etc. are disposed in the case.

The case according to the fourth exemplary embodiment is formed by combining a first engaging portion 10 formed along the outer circumferential portion of the first member 1B corresponding to a backside of the case and a second engaging portion 20 formed along the outer circumferential portion of the second member 2B corresponding to a frontside of the case. When the first engaging portion 10 of the first member 1B and the second engaging portion 20 of the second member 2B makes contact with each other, a fixing screw penetrates hole 1a of the first member 1B to arrive at a screw hole 27a of the screw boss corresponding to the inner supporting member 27 to prevent separation between the first member 1B and the second member 2B. In the present embodiment, the inner supporting member 27 operates as the screw boss. The first engaging portion 10 of the first member 1B and the second engaging portion 20 of the second member 2B may have claws 10a and connecting recesses 20a in FIGS. 1 and 12, respectively. Alternatively, the first engaging portion 10 of the first body 1B and the second engaging portion 20 of the second body 2B may be combined with a rivet or an adhesive.

In the fourth exemplary embodiment, a rib 14 protrudes from the first engaging portion 10. The rib 14 is curved along the corner portion A of the first engaging portion 10. An outer supporting member 26 is formed at the corner portion A of the second engaging portion 20 corresponding to the first engaging portion 10. The inner supporting member 27 that operates as the screw boss is formed at the second member 2B. The inner supporting member 27 has, for example a cylindrical shape. When the first member 1B and the second member 2B are combined with each other, the rib 14 of the first member 1B is inserted between the inner supporting member 27 and the outer supporting member 26 such that the inner supporting member 27 makes line-contact with the inner circumferential surface 14b of the rib 14 and the outer supporting member 26 makes surface-contact with the outer circumferential surface 14a of the rib 14. The rib 14, the outer supporting member 26 and the inner supporting member 27 define a corner portion engaging member 6. A radius of curvature R3 of the inner circumferential surface 14b of the rib 14 is smaller than a radius of curvature r3 of the inner supporting member 27. The radius of curvature R3 may be zero.

In the fourth exemplary embodiment, the elements of the corner portion A of the case are disposed as shown in FIG. 23, when the first member 1B corresponding to the backside of the case is combined with the second member 2B corresponding to the frontside of the case. In detail, when the first member 1B and the second member 2B are combined with each other, the rib 14 is inserted between the outer supporting member 26 formed at the corner portion A of the second member 2B and the inner supporting member 27 having a cylindrical shape to fasten the first member 1B and the second member 2B to each other. The outer surface of the inner supporting member 27 makes line-contact with the inner circumferential surface 14b of the rib 14 at two contact regions I and J, and an inner surface of the outer supporting member 26 makes surface-contact with the outer circumferential surface 14a of the rib 14.

According to the fourth exemplary embodiment, when the first member 1B and the second member 2B are combined with each other, a relative position of the first member 1B and the second member 2B is determined by the corner portion engaging member 6. Furthermore, a contact area between the inner circumferential surface 14b of the rib 14 and the inner supporting member 27 is reduced to reduce creak induced by scratch between the inner circumferential surface 14b of the rib 14 and the inner supporting member 27. Additionally, the scratch between elements, which is caused by deviated combination between the first member 1B and the second member 2B may be prevented. Additionally, the corner portion engaging member 6 is disposed in the corner portion A of the case so that the corner portion engaging member 6 requires no additional space. As a result, a space for disposed electronic elements is not reduced, while enhancing strength of the case. Furthermore, the inner supporting member 27 operates as the screw boss, so that the weight of the case and the amount for material for the case may be reduced without occupying an additional space. Additionally, the radius of curvature r3 of the inner supporting member 27 is increased, so that the inner supporting member 27 makes contact with the inner face 14b of the rib 14 at the two contact regions I and J. Therefore, the strength against the impact caused by dropping the case is enhanced.

Alternatively, the inner supporting member 27 of the second member 2B may be formed such that the radius of curvature r3 of the inner supporting member 27 is smaller than the radius of curvature R3 of the inner circumferential surface 14b of the rib 14. In this case, the inner supporting member 27 makes line-contact with the inner circumferential surface 14b of the rib 14 at one contact region as described in the first exemplary embodiment. Additionally, in order to reduce the contact area between the rib 14 and the outer supporting member 26, protrusions may be formed on the outer supporting member 26 or the outer circumferential surface 14a of the rib 14 as described in the second exemplary embodiment. Furthermore, the contact between the inner circumferential surface 14b of the rib 14 and the inner supporting member 27 may be secured by adjusting the radius r3 of curvature of the inner supporting member 27 as described in the first exemplary embodiment.

Embodiment 5

Figure 27:
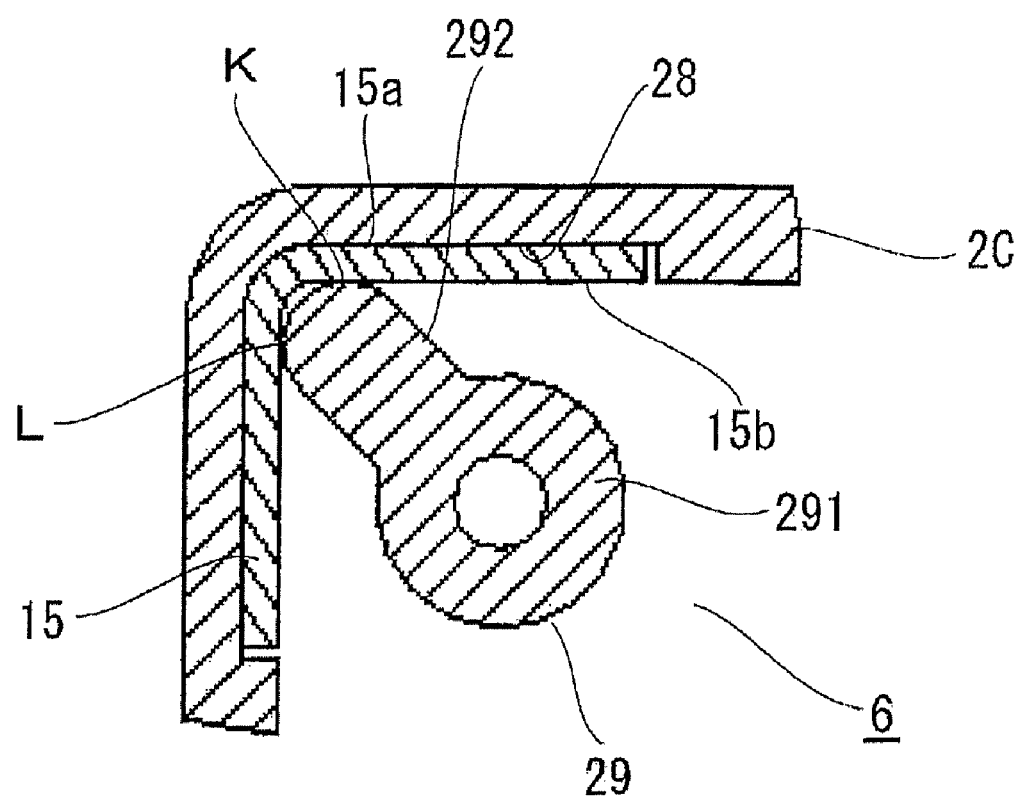
FIG. 27 is a cross-sectional view illustrating positions of elements in the corner portion when the first engaging portion and the second engaging portion in FIG. 24 are combined with each other.

FIGS. 24 through 27 are figures for explaining an electronic device according to the fifth exemplary embodiment. FIG. 24 is an exploded perspective view illustrating a case for an electronic device according to a fifth exemplary embodiment of the present invention. FIG. 25 is a perspective view illustrating a corner portion of a first engaging portion of a first member in the case in FIG. 24. FIG. 26 is a perspective view illustrating a corner portion of a second engaging portion of a second member in the case in FIG. 24. FIG. 27 is a cross-sectional view illustrating positions of elements in the corner portion when the first engaging portion and the second engaging portion in FIG. 24 are combined with each other. The electronic device in the fifth exemplary embodiment is a portable electronic game with a battery cover (not shown), a terminal cover (not shown) or the like in the case, and elements such as a printed circuit board (not shown), a battery (not shown), a key button part (not shown) etc. are disposed in the case.

The case according to the fifth exemplary embodiment is formed by combining a first engaging portion 10 formed along the outer circumferential portion of the first member 1C corresponding to a backside of the case and a second engaging portion 20 formed along the outer circumferential portion of the second member 2C corresponding to a frontside of the case. Two connecting claws 10a are formed at a first long side of the first engaging portion 10 of the first member 1C, and another two connecting claws 10a are formed at a second long side, which is opposite to the first long side. The four connecting claws 10a of the first member 1C are inserted into the four connecting recesses 20a, respectively to combine the first member 1C and the second member 2C. When the first engaging portion 10 of the first member 1C and the second engaging portion 20 of the second member 2C makes contact with each other, a fixing screw penetrates hole 1a of the first member 1C to arrive at a screw hole 27a of the screw boss corresponding to the inner supporting member 29 to prevent separation between the first member 1C and the second member 2C. The first engaging portion 10 of the first member 1C and the second engaging portion 20 of the second member 2C may have claws 10a and connecting recesses 20a in FIGS. 1 and 12, respectively. The combination between the first member 1C and the second member 2C is not limited.

In the fifth exemplary embodiment, a rib 15 protrudes from the first engaging portion 10. The rib 15 is curved along the corner portion A of the first engaging portion 10. An outer supporting member 28 is formed at the corner portion A of the second engaging portion 20 corresponding to the first engaging portion 10. The inner supporting member part 29 that operates as the screw boss is formed at the second member 2C. When the first member 1C and the second member 2C are combined with each other, the rib 15 of the first member 1C is inserted between the inner supporting member part 29 and the outer supporting member 28 such that the inner supporting member part 29 makes line-contact with the inner circumferential surface 15b of the rib 15 at two contact regions K and L and the outer supporting member 28 makes surface-contact with the outer circumferential surface 15a of the rib 15. The rib 15, the outer supporting member 28 and the inner supporting member part 29 define a corner portion engaging member 6. The inner supporting member part 29 includes a screw boss 291 and an inner supporting member 292. The screw boss 291 and the supporting member 292 are integrally formed with each other. The screw boss 291 has a cylindrical shape. The inner supporting member 292 has a shape of dragged circular shape extended from the screw boss 291 toward the outer supporting member 28. A radius of curvature R4 of the inner circumferential surface 15b of the rib 15 is smaller than a radius of curvature r4 of the inner supporting member 292. The radius of curvature R4 may be zero.

In the fifth exemplary embodiment, the elements of the corner portion A of the case are disposed as shown in FIG. 27, when the first member 1C corresponding to the backside of the case is combined with the second member 2C corresponding to the frontside of the case. In detail, when the first member 1C and the second member 2C are combined with each other, the rib 15 is inserted between the outer supporting member 28 formed at the corner portion A of the second member 2C and the inner supporting member 292 of the inner supporting member part 29 to fasten the first member 1C and the second member 2C to each other. The outer surface of the inner supporting part 292 of the inner supporting member 29 makes line-contact with the inner circumferential surface 15b of the rib 15 at two contact regions K and L, and an inner circumferential surface of the outer supporting member 28 makes surface-contact with the outer circumferential surface 15a of the rib 15.

According to the fifth exemplary embodiment, aside from the advantages of the third exemplary embodiment, the screw boss 291 receiving the fixing screw 5 and having a cylindrical shape and the dragged-circular shaped inner supporting part 292 for supporting the inner circumferential surface 15b of the rib 15 are integrally formed with each other to form the inner supporting member 29. Therefore, the strength against the impact is further enhanced to reduce deformation of the case. As a result, damages caused by dropping the case are reduced.

Alternatively, the inner supporting part 292 of the inner supporting member 29 may be formed such that the radius of curvature r4 of the inner supporting part 292 is smaller than the radius of curvature R4 of the inner circumferential surface 15b of the rib 15. In this case, the inner supporting member 29 makes line-contact with the inner circumferential surface 15b of the rib 15 at one contact region as described in the first exemplary embodiment. Additionally, in order to reduce the contact area between the rib 15 and the outer supporting member 28, protrusions may be formed on the outer supporting member 28 or the outer circumferential surface 15a of the rib 15 as described in the second exemplary embodiment. Furthermore, the contact between the inner circumferential surface 15b of the rib 15 and the inner supporting part 292 may be secured by adjusting the radius of curvature r4 of the inner supporting member 292 as described in the first exemplary embodiment.

In the first through fifth exemplary embodiments described above, it may be hard to combine the first member and the second member due to a difference of material and shape of the first member and the second member. In this case, a spatial margin may be generated between the outer surface of the inner supporting member of the second member and the inner circumferential surface of the rib of the first member or between the inner surface of the outer supporting member and the outer circumferential surface of the rib in the first member. However, it is preferable to minimize the spatial margin. Additionally, it is preferable to chamfer the edge portion of the rib, the inner supporting member and/or the outer supporting member. When the first member and the second member are manufactured through a mold, a pull-out inclination may be formed at edges of the mold to pull out the first member and the second member from the mold.

In the above described embodiments, the corner portion engaging member 6 is formed at all of the corner portions A of the case. However, the corner portion engaging member may be formed at some of the corner portions A of the case. In the above describe embodiments, the contact area between the outer circumferential surface of the rib and the outer supporting member, or between the inner circumferential surface of the rib and the inner supporting member has a line-shape that is substantially parallel with a direction of combination between the first member and the second member. However, the contact area is not limited. That is, the contact area may have a line-shape that is inclined with respect to the direction of combination between the first member and the second member. In other words, the contact area may have a line-shape that crosses the direction of combination between the first member and the second member. In the above described embodiments, the electronic devices correspond to a cellular phone, a digital camera, a portable music player or a portable electronic game. However, the electronic device is not limited. For example, the electronic device may be a portable communication apparatus, a radio set, a television set, a notebook computer, a word processor, a video camera, an electronic scheduler, a remote controller, an electronic calculator, etc. The present invention may be also applied to an electronic device that is not portable.

Various modifications and alterations of this invention will be apparent to those skilled in the art without departing from the scope and spirit of this invention, and it should be understood that this is not limited to the illustrative embodiment set forth herein.

What is claimed is:

1. An electronic device, comprising:
a case, the case including:
a first member having a back side forming a rear face of the case and first sidewalls orthogonal to the back side;
a second member having a front side forming a front face of the case and second sidewalls orthogonal to the front side wherein the case is formed by combining the first member with the second member;
at least one curved corner, formed by adjoining sidewalls, in a plan view orthogonal to a plane parallel to the back side and the front side;
a corner engaging member including a rib formed on adjoining first sidewalls of a corner portion of the first member such that the rib is curved to be disposed on both of the adjoining sidewalls that form the corner portion of the first member;
an outer supporting member formed on adjoining second sidewalls at a corner portion of the second member and making contact with an outer circumferential surface of the rib when the first member and the second member are combined; and
an inner supporting member formed on the second member for making line-contact with an inner circumferential surface of the rib when the first and second member are combined, said line contact being in the direction orthogonal to the front side.

2. The electronic device of claim 1, wherein the outer circumferential surface of the rib makes surface-contact with the outer supporting member.

3. The electronic device of claim 1, further comprising a protrusion formed at one of the outer circumferential surface of the rib and the outer supporting member to make line-contact with the other of the outer circumferential surface of the rib and the outer supporting member.

4. The electronic device of claim 1, wherein the inner circumferential surface of the rib makes line-contact with the inner supporting member at a plurality of regions separated by non-contact regions in a circumferential direction.

5. The electronic device of claim 1, wherein the outer supporting member has a sidewall corner portion which is formed at the corner portion of the second member by recessing a sidewall portion of the corner portion of the second member by a thickness of the rib.

6. The electronic device of claim 1, wherein the inner supporting member is a protrusion having a column-shape which is provided in the second member.

7. The electronic device of claim 1, wherein the inner supporting member is provided in a screw boss which is formed in the second member for screw-coupling the first member and the second member, or the inner supporting member is integrally formed with the screw boss.

8. The electronic device of claim 1, wherein an engaging state of the corner engaging member is adjusted by adjusting a radius of curvature of an outer circumferential surface of the inner supporting member.

9. The electronic device as claimed in claim 1, wherein:
a portion of the inner circumferential surface of the rib in contact with the inner supporting member is smaller in area than a portion of the inner circumferential surface of the rib not in contact with the inner supporting member.

10. A case of an electronic device, the case comprising:
a first member having a back side forming a rear face of the case and first sidewalls orthogonal to the back side;
a second member having a front side forming a front face of the case and second sidewalls orthogonal to the front side wherein the case is formed by combining the first member with the second member;
at least one curved corner, formed by adjoining sidewalls, in a plan view orthogonal to a plane parallel to the back side and the front side;
a corner engaging member including a rib formed on adjoining first sidewalls of a corner portion of the first member such that the rib is curved to be disposed on both of the adjoining sidewalls that form the corner portion of the first member;
an outer supporting member formed an adjoining second sidewalls at a corner portion of the second member and making contact with an outer circumferential surface of the rib when the first member and the second member are combined; and
an inner supporting member formed on the second member for making line-contact with an inner circumferential surface of the rib when the first and second member are combined, said line contact being in the direction orthogonal to the front side.

11. The electronic device as claimed in claim 10, wherein:
a portion of the inner circumferential surface of the rib in contact with the inner supporting member is smaller in area than a portion of the inner circumferential surface of the rib not in contact with the inner supporting member.

* * * * *